(12) United States Patent
Ginder

(10) Patent No.: US 7,552,660 B2
(45) Date of Patent: Jun. 30, 2009

(54) TORQUE TRANSFER MECHANISM

(75) Inventor: William F. Ginder, Roanoke, VA (US)

(73) Assignee: Graham-White Manufacturing Company, Salem, VA (US)

(*) Notice: Subject to any disclaimer, the term of this patent is extended or adjusted under 35 U.S.C. 154(b) by 0 days.

(21) Appl. No.: 12/179,706

(22) Filed: Jul. 25, 2008

(65) Prior Publication Data

US 2008/0277235 A1 Nov. 13, 2008

Related U.S. Application Data

(63) Continuation of application No. 11/301,281, filed on Dec. 12, 2005, now Pat. No. 7,409,884.

(51) Int. Cl.
*F16H 59/00* (2006.01)
*F16H 65/00* (2006.01)

(52) U.S. Cl. .................. 74/337.5; 192/18 R; 188/73.1; 188/265

(58) Field of Classification Search ............... 188/73.1, 188/106 R, 181 T, 187; 192/18 R; 74/337.5, 74/567
See application file for complete search history.

(56) References Cited

U.S. PATENT DOCUMENTS

| | | | |
|---|---|---|---|
| 2,834,443 A | 5/1958 | Olchawa | |
| 3,667,578 A | 6/1972 | Johnson | |
| 4,944,372 A | 7/1990 | Taig | |
| 5,810,141 A * | 9/1998 | Organek et al. | 192/35 |
| 6,769,527 B1 | 8/2004 | Paris | |
| 6,974,015 B2 | 12/2005 | Gamache | |
| 7,073,638 B2 | 7/2006 | Daniel | |
| 2003/0051950 A1 * | 3/2003 | Harvey | 188/134 |

* cited by examiner

*Primary Examiner*—Tisha D Lewis
(74) *Attorney, Agent, or Firm*—Dority & Manning, P.A.

(57) ABSTRACT

The present invention discloses and claims a torque transfer mechanism. The torque transfer mechanism connects an input shaft to an output shaft to transmit rotation and torque in either direction from the input shaft to the output shaft. The torque transfer mechanism also inhibits the transmission of rotation and torque in at least one direction from the output shaft to the input shaft. In alternate embodiments, the torque transfer mechanism may transmit rotation and torque in one direction from the output shaft to the input shaft. In still further embodiments, the torque transfer mechanism may inhibit the transmission of rotation and torque in either direction from the output shaft to the input shaft.

19 Claims, 8 Drawing Sheets

TORQUE TRANSFER MECHANISM

RELATED APPLICATIONS

The present application is a Continuation Application of U.S. patent application Ser. No. 11/301,281, to be issued as U.S. Pat. No. 7,409,884 filed on Dec. 12, 2005, and which is incorporated fully herein by reference in its entirety and for all purposes. Any disclaimer that may have occurred during prosecution of the above-referenced application is hereby expressly rescinded.

BACKGROUND OF THE INVENTION

The present invention applies to any mechanical device that includes rotational movement. These devices generally include at least one shaft that receives and transmits rotation and torque. Various methods exist for transferring rotation and torque along the shaft. The shaft may include an input end for receiving rotation and torque and an output end for transmitting rotation and torque.

The present invention provides an improved torque transfer mechanism that transfers torque and rotation from one or more input shafts to an output shaft. The torque transfer mechanism may further block the transmission of torque and rotation from the output shaft to the one or more input shafts in one or both directions.

SUMMARY OF THE INVENTION

Objects and advantages of the invention are set forth below in the following description, or may be obvious from the description, or may be learned through practice of the invention.

The present invention provides an apparatus for transferring torque. In one embodiment, the apparatus for transferring torque includes a plate, a brake, and first and second shafts. The plate defines first and second surfaces and has an axis of rotation. The brake is configured for releasable engagement with the plate. The first shaft has a first distal end that is rotationally coupled to the first surface of the plate. The second shaft has a second distal end that is rotationally coupled to the second surface of the plate. The apparatus further includes a first set of depressions on the first surface of the plate and the first distal end of the first shaft and a second set of depressions on the second surface of the plate and the second distal end of the second shaft. A first set of actuating balls is disposed between the first set of depressions, and a second set of actuating balls is disposed between the second set of depressions. The first set of depressions and first set of actuating balls are configured so that torque applied to the first shaft in a first direction increases the engagement between the plate and the brake to inhibit the transfer of torque in the first direction to the second shaft. The second set of depressions and second set of actuating balls are configured so that the plate transfers torque applied to the second shaft in either direction to the first shaft.

In particular embodiments, the first set of depressions and first set of actuating balls may be further configured so that torque applied to the first shaft in a second direction increases the engagement between the plate and the brake to inhibit the transfer of torque in the second direction to the second shaft. In other particular embodiments, the brake may be configured so that the plate transfers torque applied to the first shaft in a second direction to the second shaft. The brake may be a friction disk in some embodiments and a one-way clutch in other embodiments. At least one of the first set of depressions or second set of depressions may define a conical surface or a concave surface. The first set of depressions may define a first included angle on a first axis, and the second set of depressions may define a second included angle on a second axis. In particular embodiments, the first included angle may be different than the second included angle. Alternately or in addition, at least one of the first axis or second axis may be tilted away from the axis of rotation of the plate. In further particular embodiments, the plate may be biased away from engagement with the brake.

In an alternate embodiment within the scope of the present invention, the apparatus for transferring torque includes a plate, a brake, and first and second shafts. The plate defines first and second surfaces and has an axis of rotation. The brake is configured for releasable engagement with the plate. The first shaft has a first distal end that is rotationally coupled to the first surface of the plate. The second shaft has a second distal end that is rotationally coupled to the second surface of the plate. The apparatus further includes a first set of depressions on the first surface of the plate and the first distal end of the first shaft and a second set of depressions on the second surface of the plate and the second distal end of the second shaft. A first set of actuating balls is disposed between the first set of depressions. The first set of depressions and first set of actuating balls are configured so that torque applied to the first shaft in a first direction increases the engagement between the plate and the brake to inhibit the transfer of torque in the first direction to the second shaft. The second set of depressions are configured so that the plate transfers torque applied to the second shaft in either direction to the first shaft.

In yet another embodiment within the scope of the present invention, the apparatus for transferring torque includes a plate, a brake, and first and second shafts. The plate defines first and second surfaces and has an axis of rotation. The brake is configured for releasable engagement with the plate. The first shaft has a first distal end that is rotationally coupled to the first surface of the plate. The second shaft has a second distal end that is rotationally coupled to the second surface of the plate. The apparatus further includes a first set of depressions on the first surface of the plate and the first distal end of the first shaft and a second set of depressions on the second surface of the plate and the second distal end of the second shaft. The first set of depressions are configured so that torque applied to the first shaft in a first direction increases the engagement between the plate and the brake to inhibit the transfer of torque in the first direction to the second shaft. The second set of depressions are configured so that the plate transfers torque applied to the second shaft in either direction to the first shaft.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
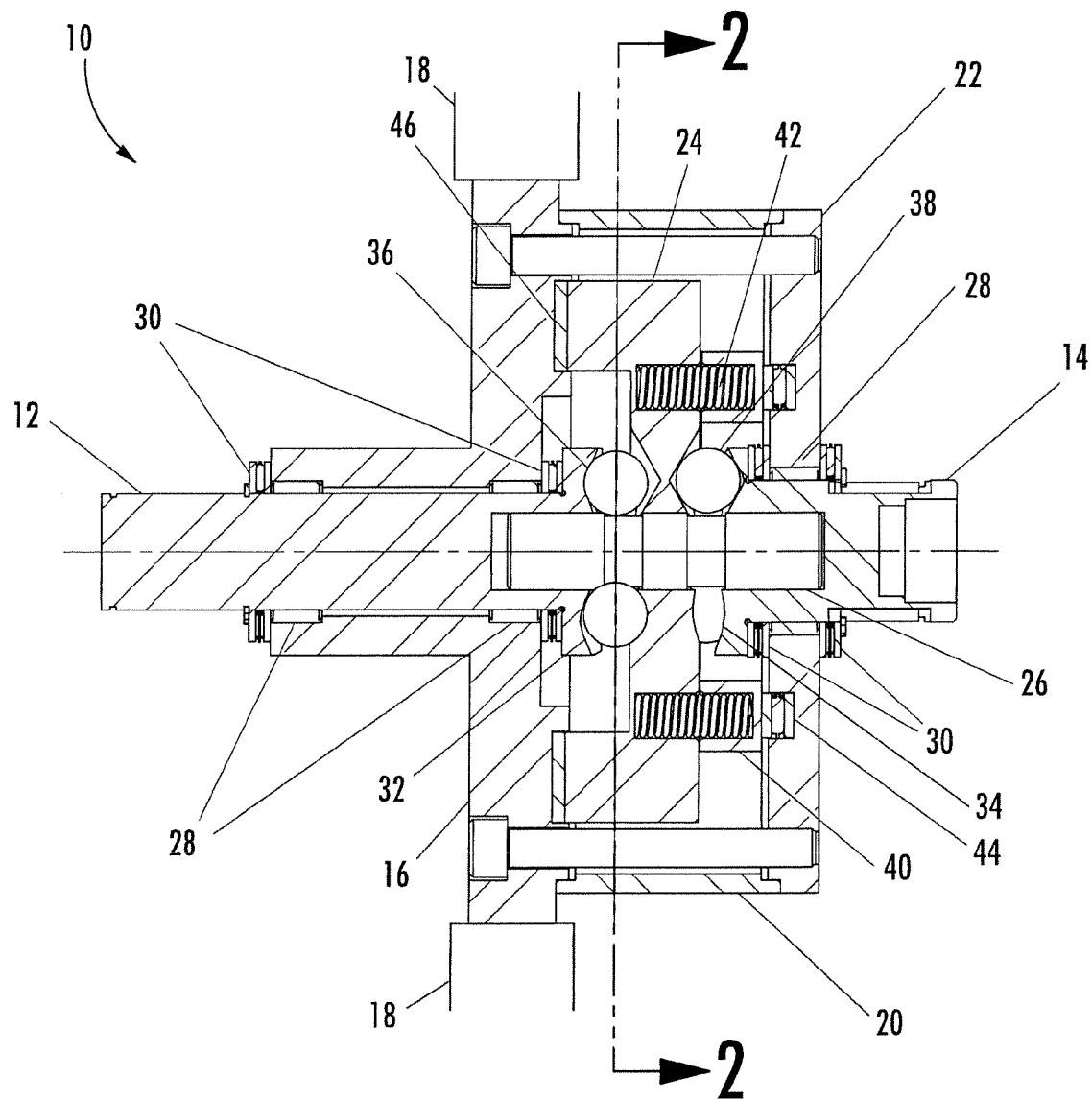
FIG. 1 is a plan view of an embodiment of the present invention.

Repeat use of reference characters in the present specification and drawings is intended to represent the same or analogous features or elements of embodiments of the invention.

DETAILED DESCRIPTION

Reference will now be made in detail to present embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates a torque transfer mechanism 10 constructed according to an embodiment of the present invention. The torque transfer mechanism 10 of this embodiment connects an input shaft 12 to an output shaft 14 to transmit rotation and torque from the input shaft 12 to the output shaft 14 while inhibiting the transmission of rotation and torque from the output shaft 14 to the input shaft 12. As a result, the torque transfer mechanism 10 allows the input shaft 12 to rotate the output shaft 14 in either direction. However, the torque transfer mechanism 10 inhibits the output shaft 14 from rotating in either direction unless the input shaft 12 is rotating in the same direction and at the same speed as the output shaft 14.

As shown in FIG. 1, the torque transfer mechanism 10 includes a mounting flange 16 fixedly attached to a static support member 18 of the mechanical device in which it is used. A housing tube 20 fixedly connects an output cap 22 to the mounting flange 16. A pressure plate 24 between the input shaft 12 and output shaft 14 is capable of limited rotational and axial motion relative to the input shaft 12 and output shaft 14. An alignment shaft 26 supports the pressure plate 24 in axial alignment with the input shaft 12 and output shaft 14. Axial bearings 28 support the input shaft 12 and output shaft 14 to allow the input shaft 12 and output shaft 14 to rotate freely on the same axis with respect to the mounting flange 16 and output cap 22, respectively. Thrust bearings 30 prevent axial movement of the input shaft 12 and output shaft 14 with respect to the mounting flange 16 and output cap 22, respectively.

The pressure plate 24 includes a circular pattern of depressions 32, 34, countersinks, indentations, or cam surfaces on opposing sides. The depressions 32, 34 are mirrored in the opposing surfaces of the input shaft 12 and output shaft 14 to form complementary surfaces. As a result, rotation and torque applied to the input shaft 12 produce contact by the depressions 32 located between the input shaft 12 and the pressure plate 24 to impart a proportional axial force on the pressure plate 24 away from the input shaft 12. Conversely, rotation and torque applied to the output shaft 14 produce contact by the depressions 34 located between the output shaft 14 and the pressure plate 24 to impart a proportional axial force on the pressure plate 24 away from the output shaft 14. The embodiment shown in FIGS. 1 and 3 further includes actuating balls 36, 38 in the cavities formed by the opposing depressions 32, 34. The actuating balls 36, 38 contact opposing surfaces of the depressions 32, 34 to impart axial forces on the pressure plate 24 proportional to the rotation and torque applied to the input shaft 12 and output shaft 14, respectively. Alternate embodiments within the scope of the present invention may include depressions on only one side of the pressure plate, with or without actuating balls in the cavities formed by the depressions.

A load ring 40 supports an arrangement of compression springs 42 against one side of the pressure plate 24. A thrust bearing 44 in the output cap 22 permits the load ring 40 to rotate with respect to the output cap 22 so that the compression springs 42 provide a uniform load on the pressure plate 24 away from the output shaft 14.

The opposite side of the pressure plate 24 bears against a brake to create a releasable rotational clamp on the pressure plate 24. The brake may comprise a friction disk 46 (as shown in FIG. 1), a releasable coupling, a ratchet and pawl mechanism, and any other device known to one of ordinary skill in the art for reducing, stopping, preventing, blocking, slowing, inhibiting, or interrupting relative movement between two objects. As shown in FIG. 1, the friction disk 46 may be located between the mounting flange 16 and the pressure plate 24. Alternate embodiments within the scope of the present invention may include a wear ring (not shown) between the friction disk 46 and the pressure plate 24. The compression springs 42 bias the pressure plate 24 against the friction disk 46 to create a slight clamping force between the pressure plate 24, friction disk 46, and mounting flange 16. In alternate embodiments, the load ring 40, compressions springs 42, and thrust bearing 44 may be arranged on the opposite side of the pressure plate 24 to provide a uniform load on the pressure plate 24 away from the input shaft 12, thus biasing the pressure plate 24 away from the friction disc 46.

Figure 2:
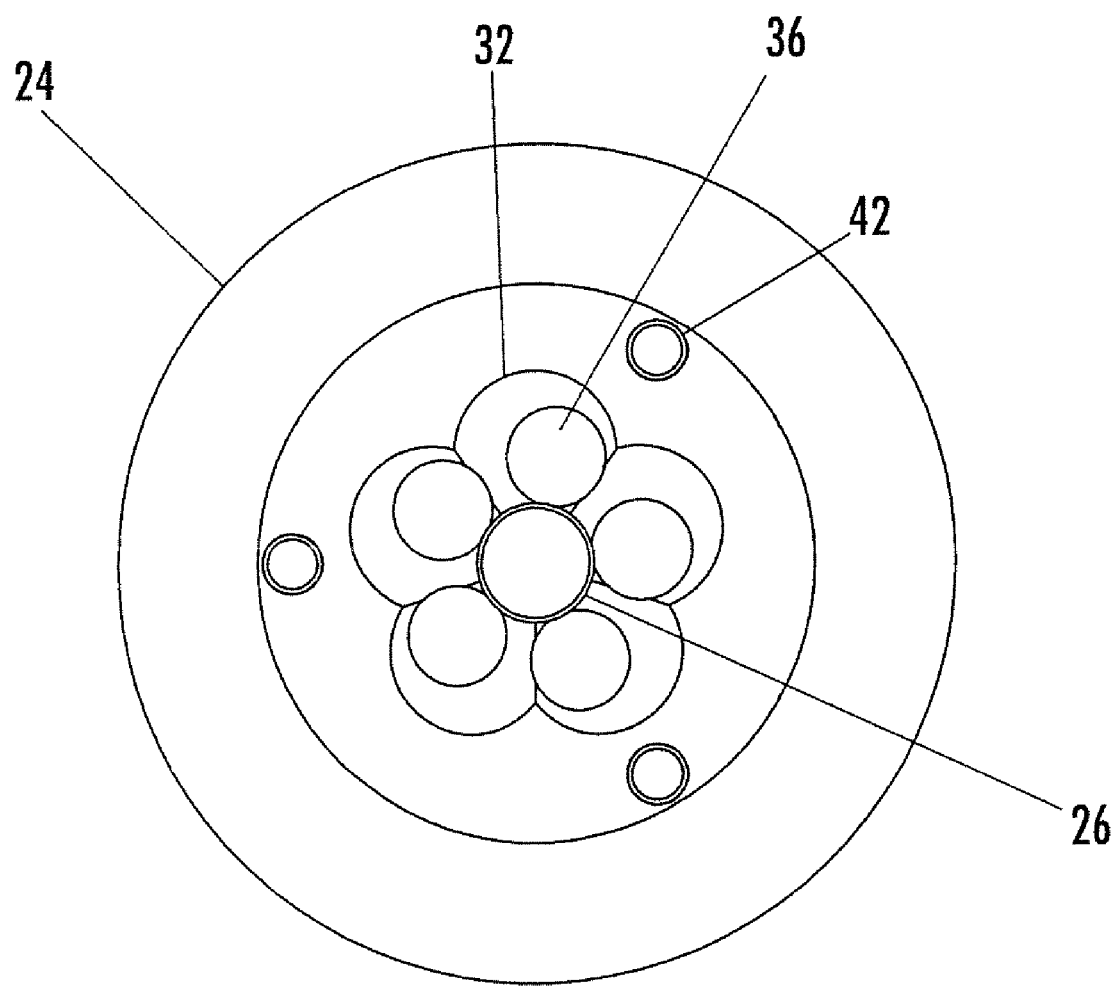
FIG. 2 is a simplified cross-section view of the invention shown in FIG. 1 along line 2-2.

FIG. 2 illustrates the circular arrangement of the actuating balls 36 in the cavities formed by the depressions 32 on the input shaft 12 side of the pressure plate 24. The circular arrangement of the actuating balls 38 in the cavities formed by the depressions 34 on the output shaft 14 side of the pressure plate 24 is similar.

Figure 3:
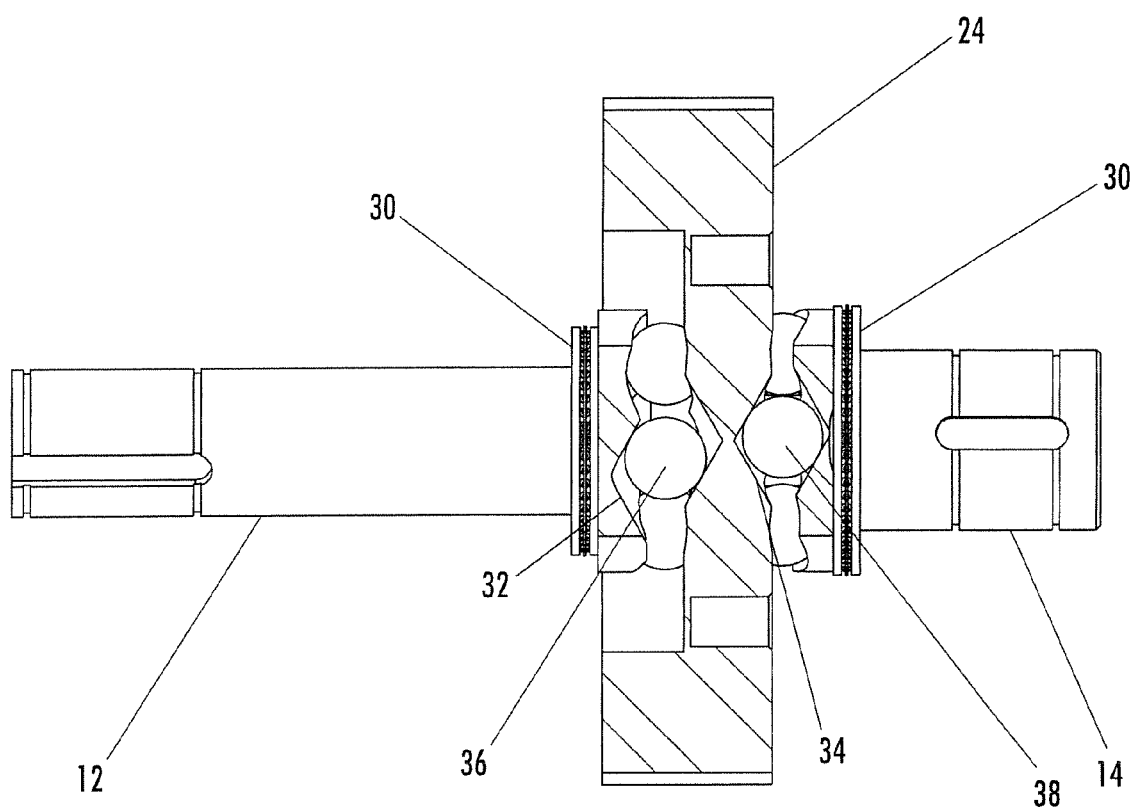
FIG. 3 is a simplified plan view of a portion of the torque transfer mechanism shown in FIG. 1.

FIG. 3 is a simplified plan view of a portion of the torque transfer mechanism 10 shown in FIG. 1. In this particular embodiment, the axes of the depressions 32, 34 are parallel to the axis of the pressure plate 24, and the depressions 32, 34 on each side of the pressure plate are conical, symmetrical, and mirrored in the opposing surfaces of the input shaft 12 and output shaft 14. As a result, the actuating balls 36, 38 will produce an equal but opposite axial force against the pressure plate 24 for a given torque applied to the input shaft 12 and output shaft 14, respectively.

As shown in FIG. 3, rotation and torque are being applied to the input shaft 12. The slight rotational movement between the input shaft 12 and the pressure plate 24 causes the actuating balls 36 to contact opposing surfaces of the depressions 32 to impart an axial force on the pressure plate 24 away from the input shaft 12. This axial force on the pressure plate 24 away from the input shaft 12 reduces the clamping force between the pressure plate 24, friction disk 46, and mounting flange 16. The clamping force will be completely removed when the axial force on the pressure plate 24 away from the input shaft 12 (i.e., from torque applied to the input shaft 12) is greater than the axial force on the pressure plate 24 away from the output shaft 14 (i.e., from the torque applied to the output shaft 14 combined with the axial force of the compression springs 42). When the clamping force is completely removed, the torque transfer mechanism 10 will transfer rotation and torque from the input shaft 12, through the actuating balls 36, 38 and the pressure plate 24, to the output shaft 14. If the rotational speed of the output shaft 14 begins to exceed the rotational speed of the input shaft 12, the clamping force between the pressure plate 24, friction disk 46, and mounting flange 16 will be re-established to slow the rotation of the output shaft 14 to equal the rotational speed of the input shaft 12.

Conversely, when torque is applied to the output shaft 14, the slight rotational movement between the output shaft 14 and the pressure plate 24 causes the actuating balls 38 to contact opposing surfaces in the depressions 34 to impart an axial force on the pressure plate 24 away from the output shaft 14. This axial force on the pressure plate 24 away from the output shaft 14 increases the clamping force between the pressure plate 24, friction disk 46, and mounting flange 16 to inhibit the output shaft 14 from further rotation.

In alternate embodiments, the shape, included angle, and orientation of the depressions 32, 34 may vary according to the particular needs of the mechanical device. For example, the surface of the depressions 32, 34 may be straight, concave, or convex to vary the proportion of the axial force generated by the actuating balls 36, 38 on the pressure plate 24 for a given torque applied to the input shaft 12 or output shaft 14.

The included angle of the depressions 32 between the input shaft 12 and the pressure plate 24 may be different than the included angle of the depressions 34 between the output shaft 14 and the pressure plate 24. For example, an increase in the arc of the included angle of the depressions 32 between the input shaft 12 and the pressure plate 24 causes the actuating balls 36 between the input shaft 12 and the pressure plate 24 to produce more axial force on the pressure plate 24 than the actuating balls 38 between the output shaft 14 and the pressure plate 24 for a given torque applied to the input shaft 12 and output shaft 14, respectively. This produces a more efficient transfer of torque between the input shaft 12 and the output shaft 14 and also allows a slight amount of torque and rotation to be transmitted from the output shaft 14 to the input shaft 12 before the braking action on the output shaft 14 occurs. A decrease in the included angle of the depressions 32 between the input shaft 12 and the pressure plate 24 produces the opposite results.

The axial orientation of the depressions 32, 34 may be tilted away from the axis of the pressure plate 24. This will cause the actuating balls 36, 38 to impart a different amount of axial force on the pressure plate 24 in response to equal but opposite amounts of torque applied to the input shaft 12 or output shaft 14.

Figure 4:
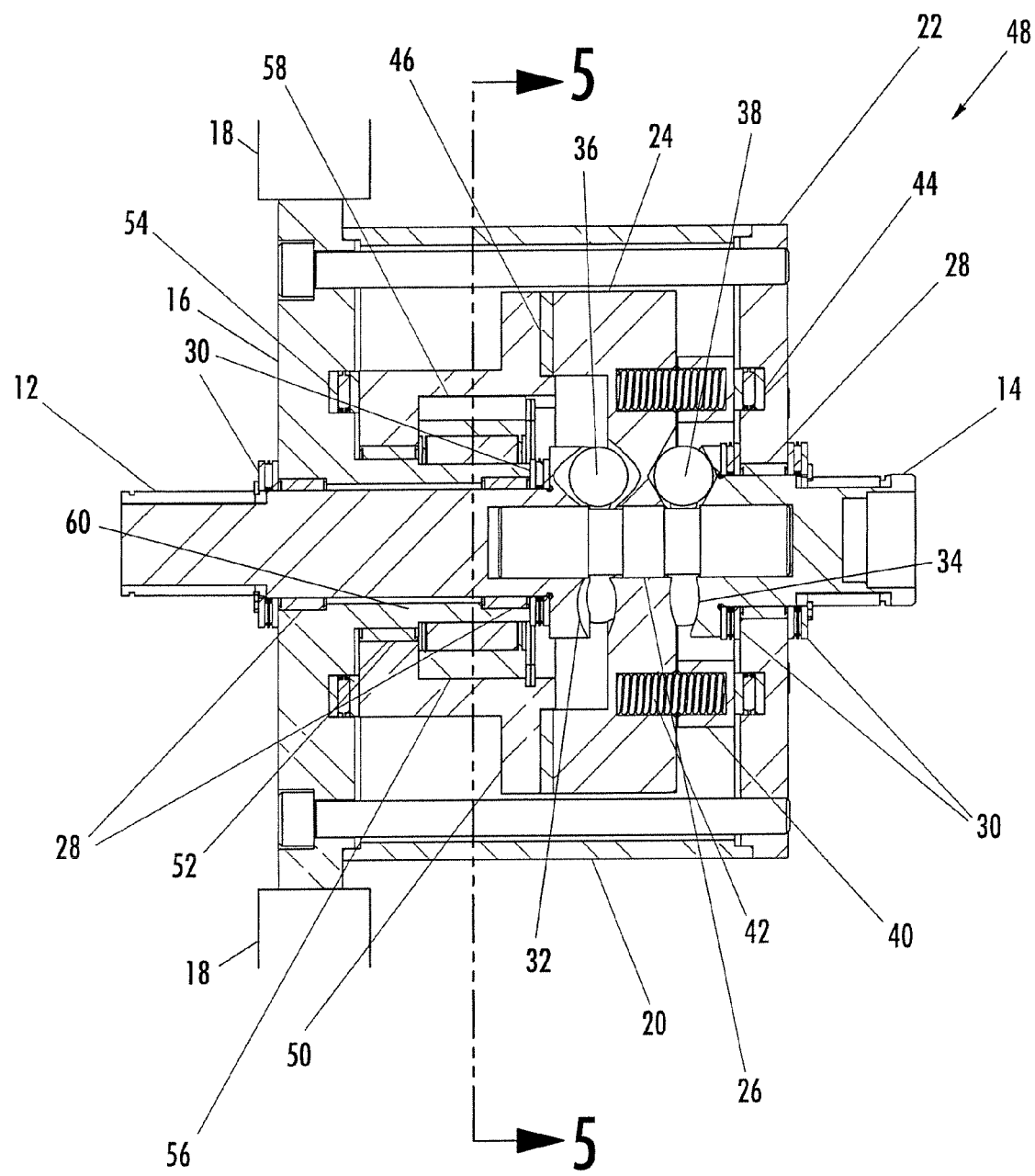
FIG. 4 is a plan view of an alternate embodiment of the present invention.

FIG. 4 illustrates an alternate embodiment of a torque transfer mechanism 48 constructed according to the present invention. The embodiment of the torque transfer mechanism 48 shown in FIG. 4 is similar to the embodiment shown in FIG. 1, and only the differences will be described.

As with the embodiment shown in FIG. 1, the torque transfer mechanism 48 shown in FIG. 4 connects the input shaft 12 to the output shaft 14 to transmit rotation and torque from the input shaft 12 to the output shaft 14. In addition, the torque transfer mechanism 48 shown in FIG. 4 permits the output shaft 14 to transmit rotation and torque to the input shaft 12 in one direction while inhibiting the transmission of rotation and torque from the output shaft 14 to the input shaft 12 in the opposite direction. As a result, the torque transfer mechanism 48 allows the input shaft 12 to rotate the output shaft 14 in either direction. In addition, the torque transfer mechanism 48 allows the output shaft 14 to rotate the input shaft 12 in one direction and inhibits the output shaft 14 from rotating the input shaft 12 in the opposite direction.

In the torque transfer mechanism 48 shown in FIG. 4, the side of the friction disk 46 away from the pressure plate 24 bears against a clutch plate 50, rather than the mounting flange 16. Axial bearings 52 support the clutch plate 50 and allow the clutch plate 50 to rotate freely on the same axis with respect to the mounting flange 16 and input shaft 12. Thrust bearings 54 prevent axial movement of the clutch plate 50 with respect to the mounting flange 16 and input shaft 12.

A commercially available one-way clutch 56 fixedly attaches inside the clutch plate 50 with a key 58. The one-way clutch 56 surrounds a hollow nose projection 60 from the mounting flange 16 surrounding the input shaft 12. An arrangement of cams 62, roller ramps, ratchets, or other locking means in the one-way clutch 56 engage the hollow nose projection 60 to allow the one-way clutch 56 and clutch plate 50 to rotate freely in one direction but inhibit rotation in the opposite direction.

Figure 5:
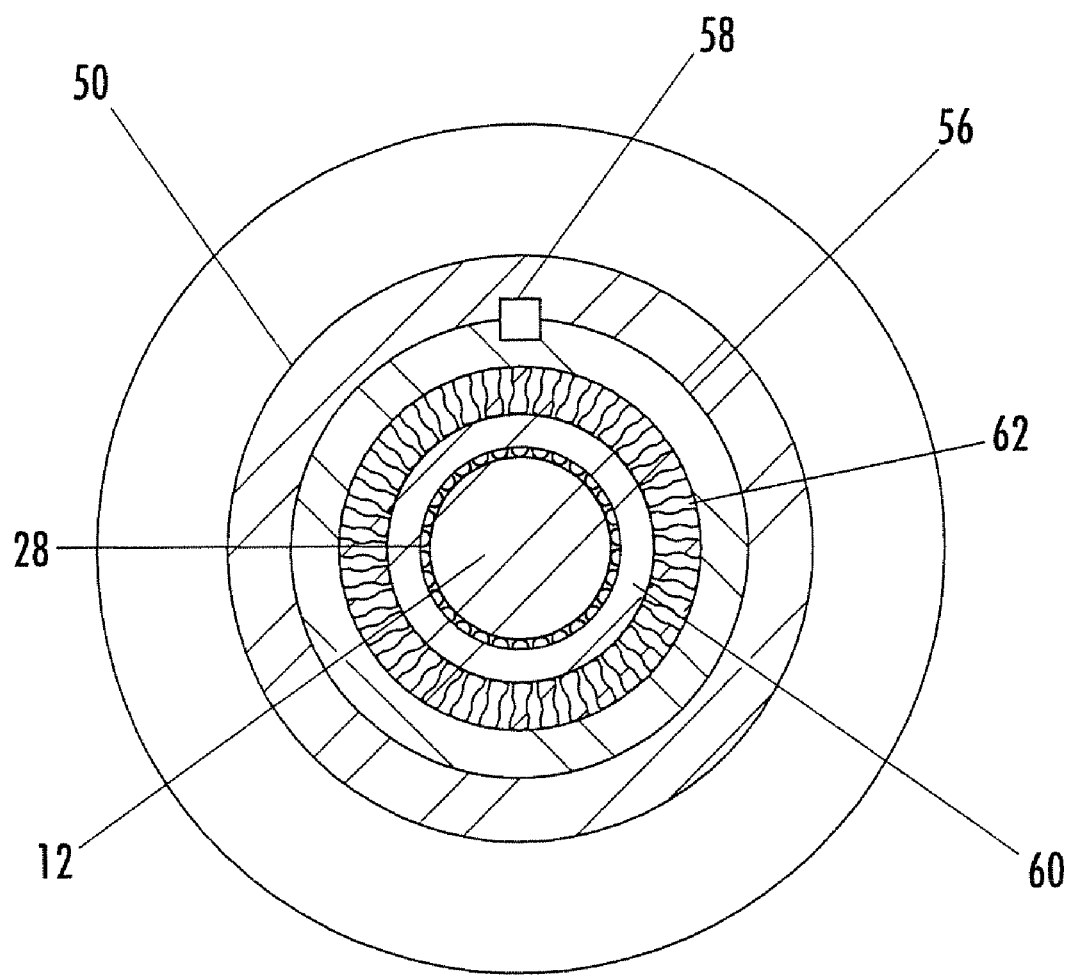
FIG. 5 is a simplified cross-section view of the invention shown in FIG. 4 along line 5-5.

FIG. 5 provides a simplified cross-section of the one-way clutch 56 and clutch plate 50 arrangement. As shown, the one-way clutch 56 and clutch plate 50 rotate freely clockwise with respect to the hollow nose projection 60, but rotation in the opposite direction is inhibited.

Figure 6:
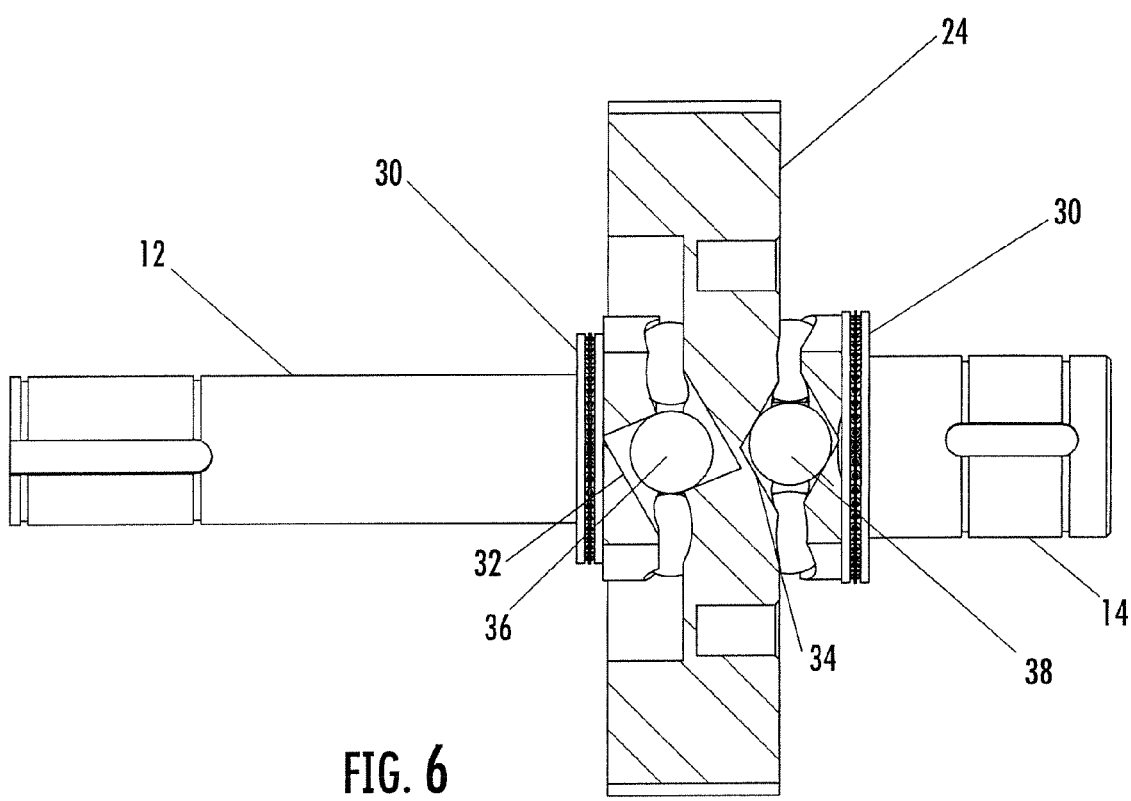
FIG. 6 is a simplified plan view of a portion of the torque transfer mechanism shown in FIG. 4 showing clockwise rotation and torque being applied to the input shaft.

FIG. 6 is a simplified plan view of a portion of the torque transfer mechanism 48 shown in FIG. 4. In this embodiment, the axes of the depressions 34 between the pressure plate 24 and the output shaft 14 are parallel to the axis of the pressure plate 24, as in FIGS. 1 and 3. However, the axes of depressions 32 between the pressure plate 24 and the input shaft 12 are tilted away from the axis of the pressure plate 24, and the included angle of the depressions 32 is reduced.

Viewing FIG. 6 from the left, clockwise rotation and torque are being applied to the input shaft 12. As before, the slight rotational movement between the input shaft 12 and the pressure plate 24 causes the actuating balls 36 to contact opposing surfaces of the depressions 32. The angle and orientation of the opposing surfaces of the depressions 32 between the input shaft 12 and pressure plate 24 produces a reduced amount of axial force on the pressure plate 24 away from the input shaft 12. The reduced amount of axial force on the pressure plate 24 away from the input shaft 12 is not sufficient to remove the clamping force between the pressure plate 24, friction disk 46, and clutch plate 50; however, the one-way clutch 56 and clutch plate 50 rotate freely clockwise with respect to the hollow nose projection 60 and thus allow the input shaft 12, pressure plate 24, and output shaft 14 to rotate freely in the clockwise direction. Therefore, it is not necessary to relieve the clamping force between the pressure plate 24, friction disk 46, and clutch plate 50 when torque is applied in the clockwise direction to either the input shaft 12 or the output shaft 14. In addition, if the clockwise rotational speed of the output shaft 14 exceeds the clockwise rotational speed of the input shaft 12, the one-way clutch 56 will permit the output shaft 14 to transfer rotation and torque in the clockwise direction to the input shaft 12.

Figure 7:
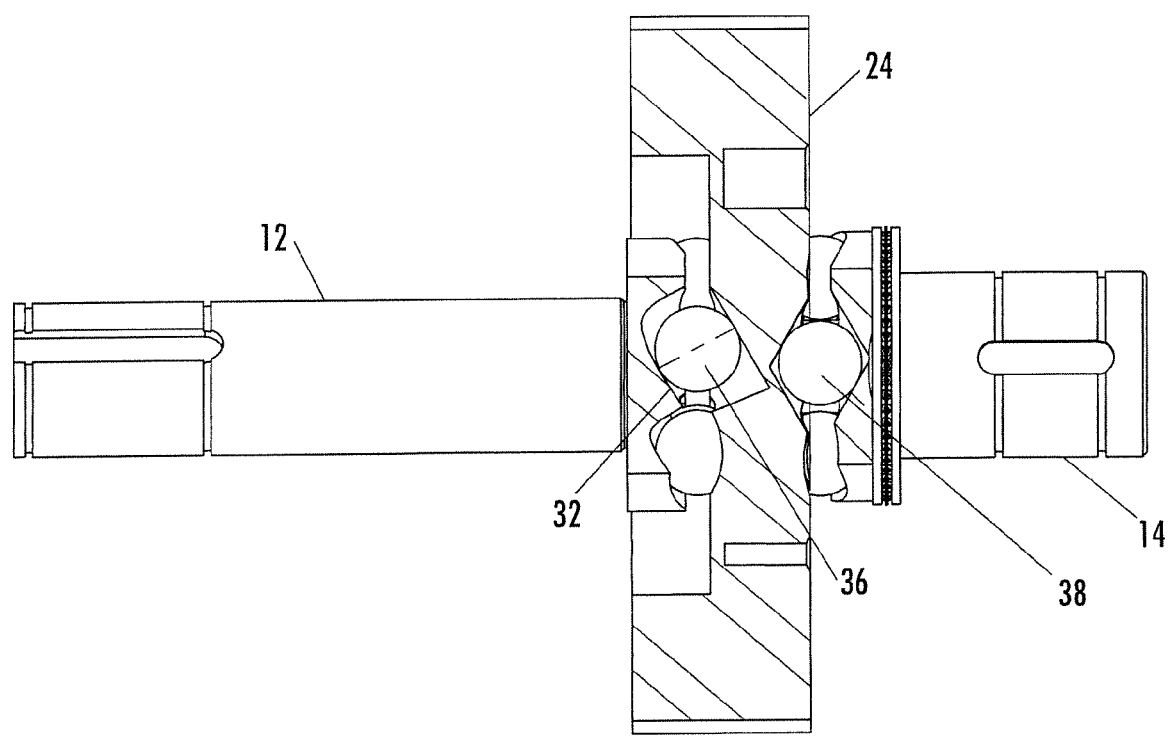
FIG. 7 is a simplified plan view of a portion of the torque transfer mechanism shown in FIG. 4 showing counter-clockwise rotation and torque being applied to the input shaft.

FIG. 7 illustrates the torque transfer mechanism 48 with counter-clockwise rotation and torque being applied to the input shaft 12, as viewed from the left. Again, the slight rotational movement between the input shaft 12 and the pressure plate 24 causes the actuating balls 36 to contact opposing surfaces of the depressions 32. The angle and orientation of the opposing surfaces of the depressions 32 between the input shaft 12 and pressure plate 24 now produces an increased amount of axial force on the pressure plate 24 away from the input shaft 12. The increased amount of axial force on the pressure plate 24 away from the input shaft 12 is necessary to remove the clamping force between the pressure plate 24, friction disk 46, and clutch plate 50 because the one-way clutch 56 and clutch plate 50 inhibit counter-clockwise rotation with respect to the hollow nose projection 60. When the clamping force between the pressure plate 24, friction disk 46, and clutch plate 50 is completely removed, the torque transfer mechanism 48 will transfer the counter-clockwise rotation and torque from the input shaft 12, through the actuating balls 36, 38 and the pressure plate 24, to rotate the output shaft 14 counter-clockwise. If the counter-clockwise rotational speed of the output shaft 14 begins to exceed the counter-clockwise rotational speed of the input shaft 12, the clamping force between the pressure plate 24, friction disk 46, and clutch plate 50 will be re-established to slow the counter-clockwise rotation of the output shaft 14 to equal the counter-clockwise rotational speed of the input shaft 12.

Figure 8:
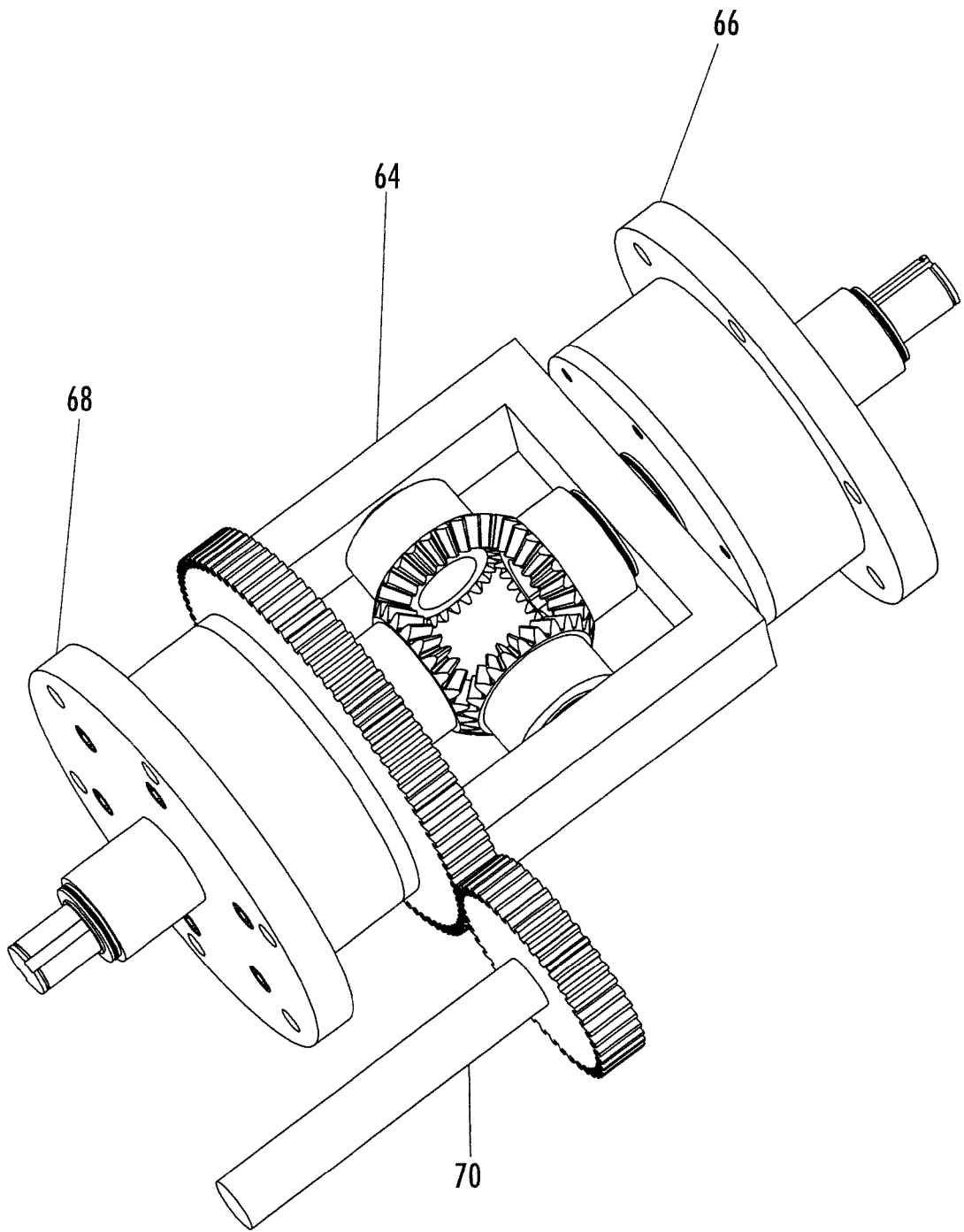
FIG. 8 is a perspective view of an application of the present invention with a differential gear set.

FIG. 8 illustrates one possible application of the present invention with a differential gear set 64. As shown, duplicate embodiments of the present invention are configured to connect to opposing sides of the differential gear set 64. As a result, two independent sources of input 66, 68 may alternately drive a common output 70 in either direction. Each input source 66, 68 is isolated from the reactive torques produced by the output 70 and the other input source 68, 66. Power can be supplied to the output 70 alternately by either input source 66, 68 or simultaneously by both without the requirement of shifting gears or coupling and uncoupling shafts. If both input sources 66, 68 are operated simultaneously, the torque of the output 70 would remain constant, and the speed of the second input source 68 would be added to the first input source 66. If the input sources 66, 68 supply different levels of torque, the differential gear set 64 could be replaced with a planetary gear set to provide similar output torque regardless of which input source was providing power.

It should be appreciated by those skilled in the art that modifications and variations can be made to the embodiments of the invention set forth herein without departing from the scope and spirit of the invention as set forth in the appended claims and their equivalents.

What is claimed is:

1. An apparatus for transferring torque comprising:
   a. a plate, said plate defining first and second surfaces and having an axis of rotation;
   b. a brake configured for releasable engagement with said plate;
   c. a first shaft, said first shaft having a first distal end rotationally coupled to said first surface of said plate;
   d. a first set of depressions on said first surface of said plate and said first distal end of said first shaft;
   e. a first set of actuating balls disposed between said first set of depressions on said first surface of said plate and said first distal end of said first shaft;
   f. a second shaft, said second shaft having a second distal end rotationally coupled to said second surface of said plate;
   g. said first set of depressions and said first set of actuating balls being configured so that torque applied to said first shaft in a first direction increases the engagement between said plate and said brake to inhibit the transfer of torque in said first direction to said second shaft.

2. The apparatus for transferring torque as in claim 1, said first set of depressions and said first set of actuating balls being configured so that torque applied to said first shaft in a second direction increases the engagement between said plate and said brake to inhibit the transfer of torque in said second direction to said second shaft.

3. The apparatus for transferring torque as in claim 2, wherein said brake comprises a friction disk.

4. The apparatus for transferring torque as in claim 1, said brake being configured so that said plate transfers torque applied to said first shaft in a second direction to said second shaft.

5. The apparatus for transferring torque as in claim 4, wherein said brake comprises a one-way clutch.

6. The apparatus for transferring torque as in claim 1, wherein said first set of depressions define a conical surface.

7. The apparatus for transferring torque as in claim 1, wherein said first set of depressions define a concave surface.

8. The apparatus for transferring torque as in claim 1, wherein said first set of depressions define a first included angle.

9. The apparatus for transferring torque as in claim 1, wherein said first set of depressions define a first axis, and said first axis is tilted away from said axis of rotation of said plate.

10. The apparatus for transferring torque as in claim 1, wherein said plate is biased away from engagement with said brake.

11. An apparatus for transferring torque comprising:
    a. a plate, said plate defining first and second surfaces and having an axis of rotation;
    b. a brake configured for releasable engagement with said plate;
    c. a first shaft, said first shaft having a first distal end rotationally coupled to said first surface of said plate;
    d. a second shaft, said second shaft having a second distal end rotationally coupled to said second surface of said plate;
    e. a set of depressions on said second surface of said plate and said second distal end of said second shaft; and
    f. said set of depressions being configured so that said plate transfers torque applied to said second shaft in either direction to said first shaft.

12. The apparatus for transferring torque as in claim 11, said brake being configured so that said plate transfers torque applied to said first shaft in a second direction to said second shaft.

13. The apparatus for transferring torque as in claim 11, wherein said set of depressions define a conical surface.

14. The apparatus for transferring torque as in claim 11, wherein said set of depressions define a concave surface.

15. The apparatus for transferring torque as in claim 11, wherein said second set of depressions define a an included angle.

16. The apparatus for transferring torque as in claim 11, wherein said second set of depressions define an axis, and said axis is tilted away from said axis of rotation of said plate.

17. The apparatus for transferring torque as in claim 11, wherein said plate is biased away from engagement with said brake.

18. An apparatus for transferring torque comprising:
    a. a plate, said plate defining first and second surfaces and having an axis of rotation;
    b. a brake configured for releasable engagement with said plate;
    c. a first shaft, said first shaft having a first distal end rotationally coupled to said first surface of said plate;
    d. a second shaft, said second shaft having a second distal end rotationally coupled to said second surface of said plate;
    e. said first distal end being configured so that torque applied to said first shaft in a first direction increases the engagement between said plate and said brake to inhibit the transfer of torque in said first direction to said second shaft; and
    f. said second distal end being configured so that said plate transfers torque applied to said second shaft in either direction to said first shaft.

19. The apparatus for transferring torque as in claim 18, wherein said first set of depressions define a first axis, said second set of depressions define a second axis, and at least one of said first axis or said second axis is tilted away from said axis of rotation of said plate.

* * * * *